Patented Dec. 4, 1951

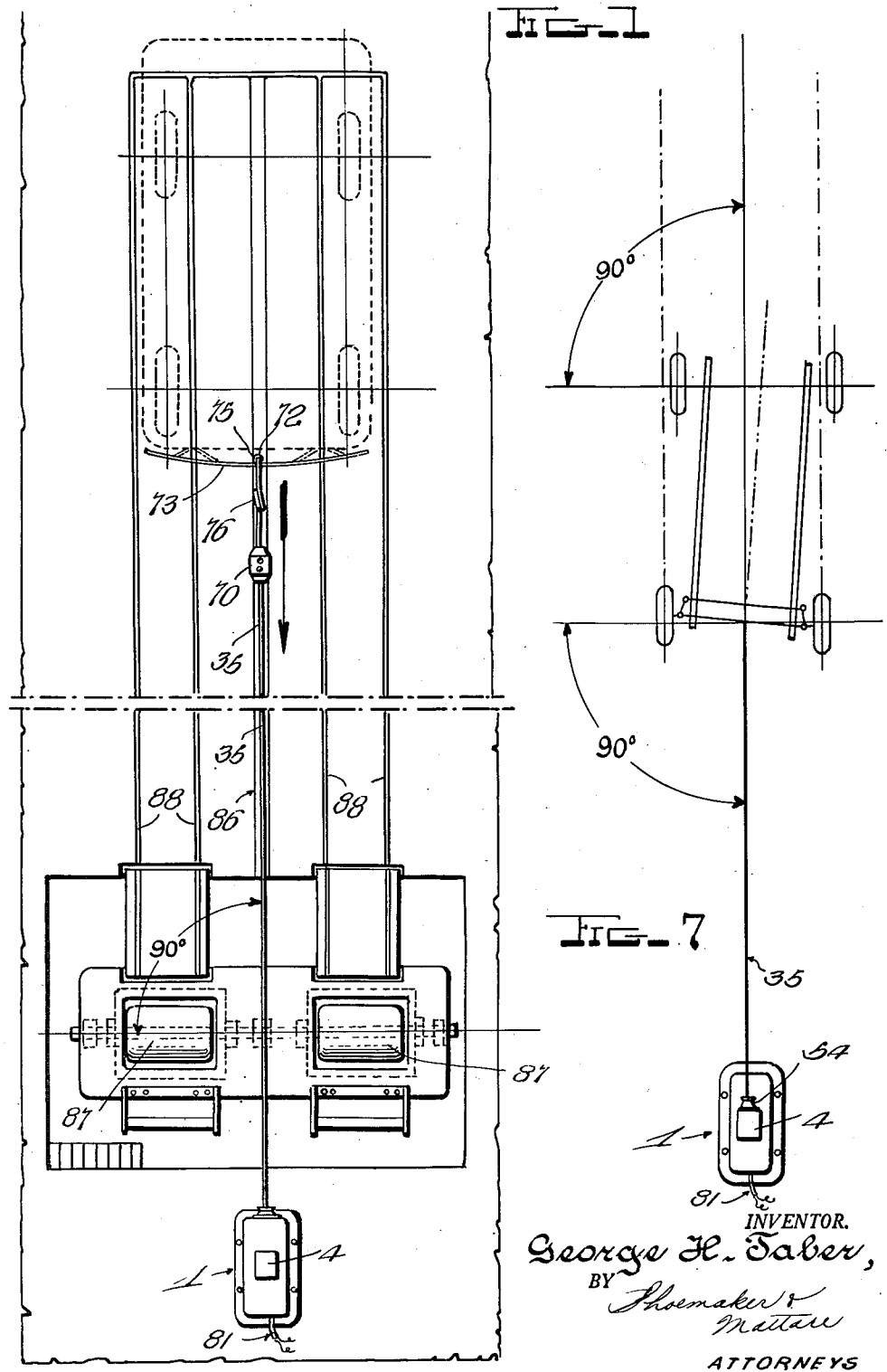

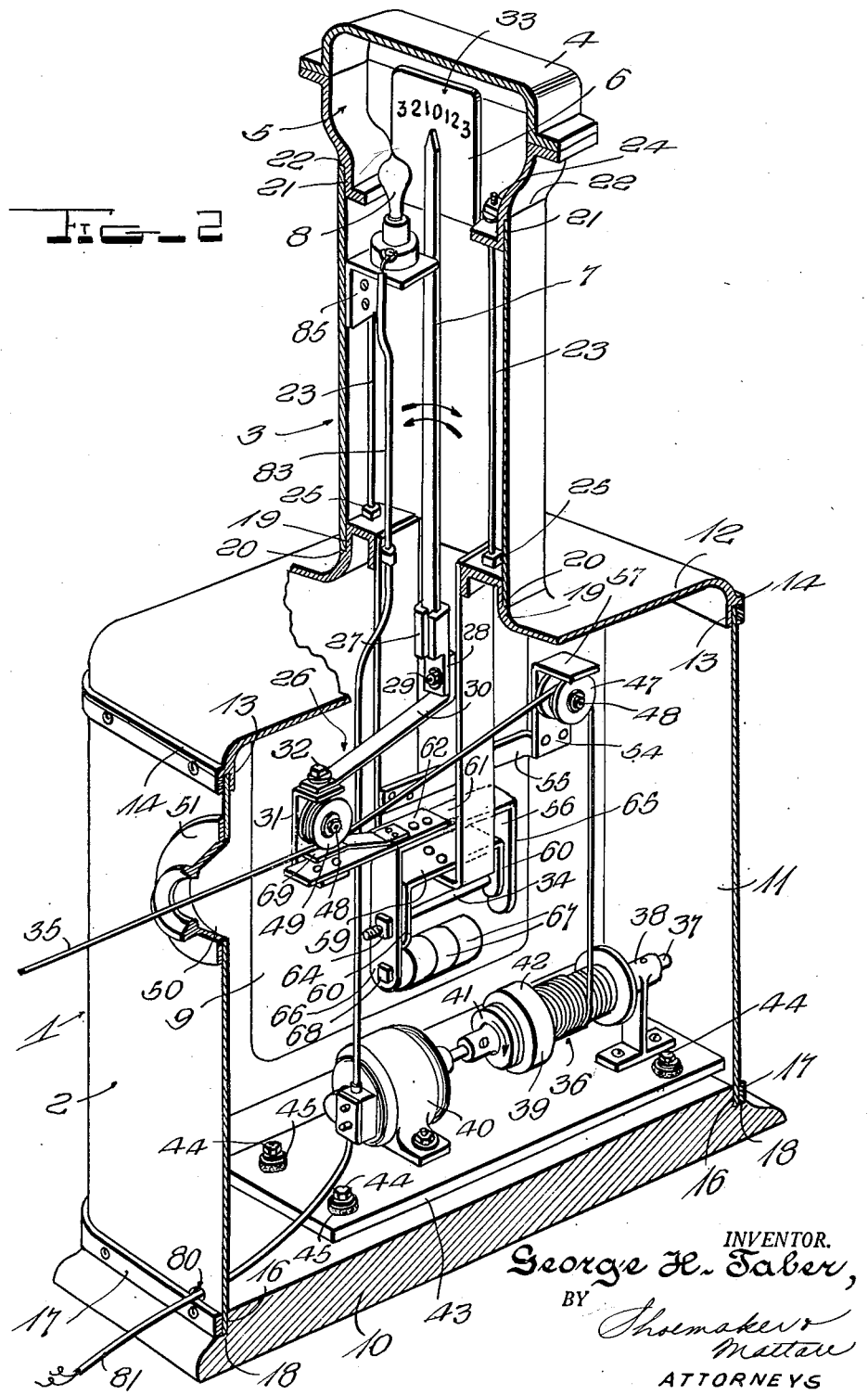

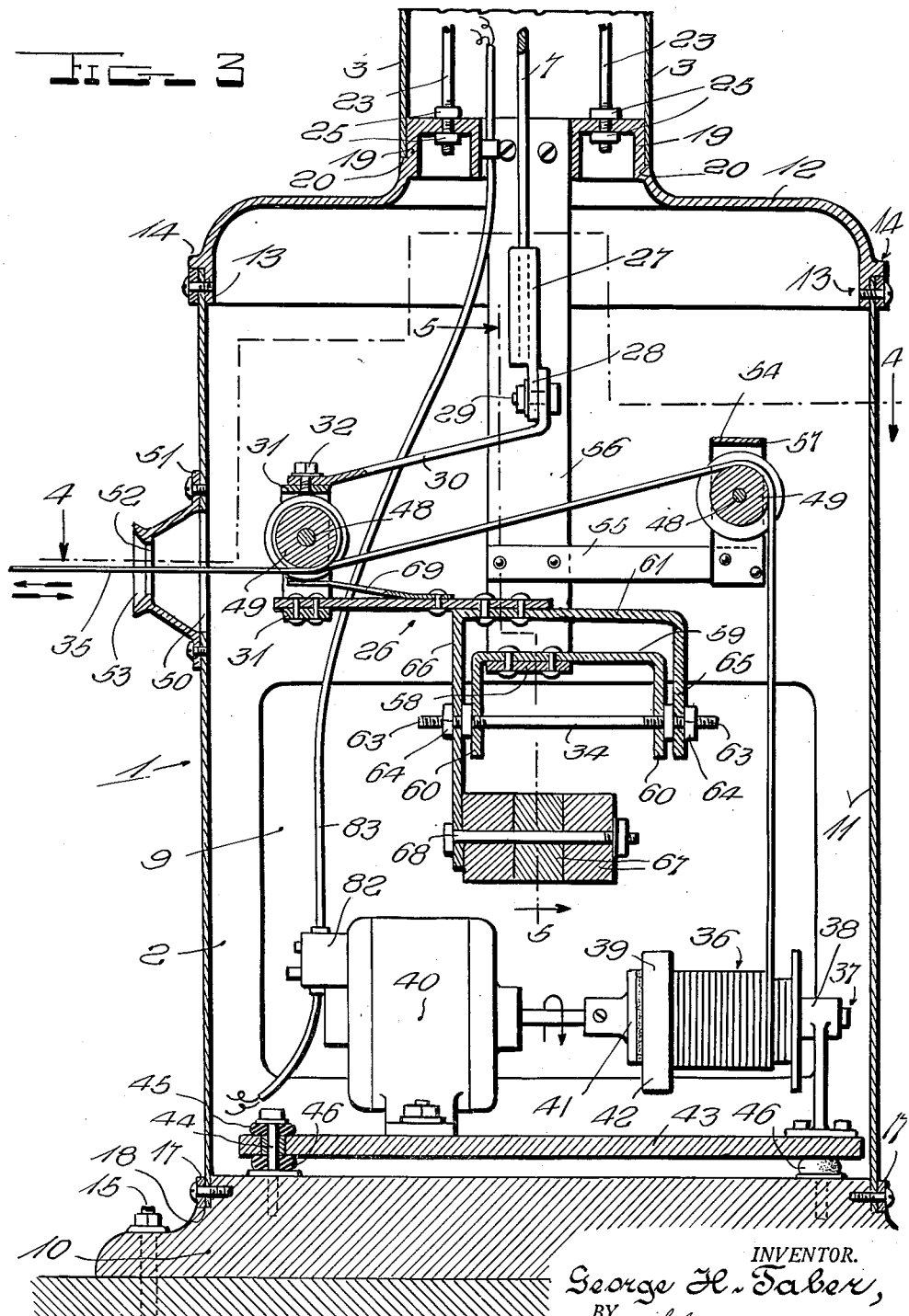

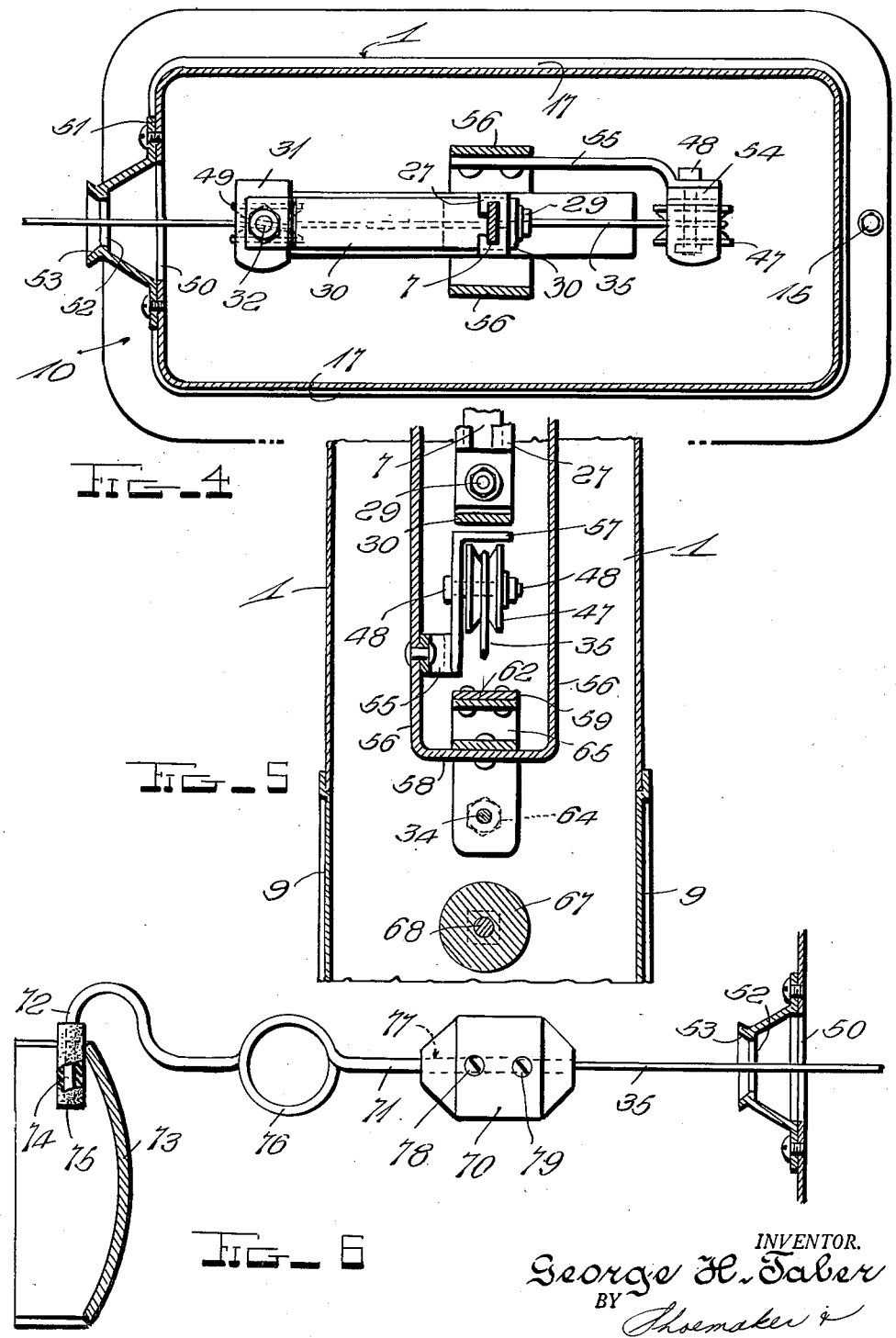

2,577,490

UNITED STATES PATENT OFFICE 2,577,490

STEERING PILOT

George H. Taber, Elmira, N. Y.

Application July 14, 1948, Serial No. 38,697

19 Claims. (Cl. 33—1)

An object of the present invention is to provide a simple, practical and accurate steering pilot of strong, durable and comparatively inexpensive construction, designed to be mounted in a fixed position on a service correction floor for enabling the driver of a motor vehicle to steer in a substantially straight line for a short distance on said correction floor to a desired or required point to position it properly with relation to a frame straightening or a wheel aligning device or other mechanism, and actuated by lateral movements of the vehicle in deviating from a straight course, and capable in progressing toward the desired position of increasing in sensitiveness and thereby insure greater ease and accuracy in positioning said vehicle.

A further object of the invention is to provide a steering pilot having means to transmit properly the directions in which a motor vehicle is steered, either in a straight line or to the right or left, to indicating means visible to the driver to guide the driver of the vehicle in driving in a substantially straight line to a proper location, or in proper relation to a frame straightening or wheel-aligning device, a hoisting mechanism or lift, or to an area requiring precision location of said vehicle for reasons of repair correction or to avoid danger resulting from obstructive view or openings in floor area or possible damaging obstructions.

Another object of the invention is to provide a steering pilot equipped with viewable dial and pointer indicator means, a power-actuated slip reel having a stiff, taught line provided with means for attaching it to a motor vehicle and a pendulum structure operatively connected with one of the members of the indicating means and connected with and adapted to be oscillated by the stiff tension line for causing the indicating means to indicate the exact line of travel of a steered motor vehicle in either direction over a shop floor for enabling the driver to steer the vehicle in substantially a straight line under guidance of the steering pilot to a pre-determined position for correction of defects. The torque on the power-actuated slip reel causes the heavy line of the slip reel to become straightened to a highly rigid state and thus to act as a lever and oscillate the pendulum structure and operate the indicating means to indicate the steered direction taken by the vehicle in its travel toward the steering pilot. If the vehicle is steered too much to the right, the pointer indicates the error and, in the same manner, will indicate the error if the vehicle is steered too much to the left. The object of the driver is to keep the pointer on the zero mark of the indicator while steering to location for the reason that, when the pointer is on zero, the rigid reel line is parallel to a center line on the service floor and deviations from such center line may be noted for correction.

Another object of the invention is to enable the power-actuated slip reel to maintain the desired rigidity in the reel line as the vehicle moves forward toward the proper location and also to allow pay out of the line when the vehicle, for some reason, requires backing up in reverse as for another try to properly position the vehicle with relation to the corrective apparatus.

Another object of the invention is to simplify the indicating means and to amplify the indication without employing all the joints and intermediate levers ordinarily employed for amplifying indicators.

It is also an object of the invention to provide a pendulum structure having a relatively long pointer for amplifying the indication and pivotally mounted below the pointer and equipped below the pivot with counter-balancing weights and having a plurality of means for enabling the pointer to be accurately calibrated.

A further object of the invention is to provide indicating means of a size to be readily visible to the driver of a motor vehicle, the desired or required distance from the steering pilot for proper observance of faults and to brilliantly illuminate the indicating means so that the steering pilot may be operated either day or night.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a plan view illustrating the arrangement of the steering pilot on the shop floor with the line of the slip reel connected to the center of the front bumper of an automobile.

Fig. 2 is a perspective view of a steering pilot constructed in accordance with this invention, the encasement or housing being broken away to illustrate the interior construction.

Fig. 3 is a vertical longitudinal sectional view of the steering pilot.

Fig. 4 is a horizontal sectional view.

Fig. 5 is a detailed vertical sectional view illustrating the construction of the central overhead sheave and the manner of mounting same.

Fig. 6 is an enlarged detail view of the means for connecting the tensioned line to a motor vehicle.

Fig. 7 is a diagrammatic view on a reduced scale showing a motor vehicle connected with the reel line of the steering pilot and illustrating the arrangement of non-tracking rear wheels due to shifting of the rear axle.

In the accompanying drawings, in which is illustrated a preferred embodiment of the invention, the steering pilot comprises in its construction a casing 1 composed of a lower body portion 2, an elongated tubular neck 3 and a hollow head 4 having a window or opening 5 and containing indicating means, preferably consisting of a stationary dial 6 and a movable pointer 7 illuminated by an electric bulb 8 or other conventional illuminating means. While the pointer of the indicating means is illustrated as being pivotally mounted and movable over a fixed dial, any suitable indicating means may be employed and the pointer may be fixed and the dial movable.

The lower body portion of the casing is of rectangular formation and is narrow and oblong in horizontal section and the said body portion is of less width than depth to present a narrow front and the lower body portion is provided, at its sides, with one or more service doors 9. The body portion 2 preferably consists of a cast metal or otherwise formed base 10, a vertical sheet metal section 11 and a cap or cover 12 preferably consisting of a casting having its lower marginal edge 13 fitted within the top of the sheet metal section 11 and secured to the same by screws or other suitable fastening means.

The cap or cover 12 is provided, on its exterior, adjacent its lower edge, with a horizontal rib 14 which forms an abutment for the upper edge of the sheet metal section 11. The base 10, which is preferably upwardly tapered and of ornamental configuration, is firmly secured in a fixed position by floor anchor bolts 15 and is provided at its upper edge with an upwardly extending inset flange 16 fitted within the lower end of the sheet metal section 11 which is secured to the base by an exteriorly arranged clamp strap 17. The clamp strap is secured to the flange 16 of the base by a plurality of screws or other suitable fastening devices which pierce the lower marginal portion of the sheet metal section 11 which is securely held between the flange 16 and the clamp strap 17 upon a shoulder 18 formed by the insetting of the upwardly extending flange 16.

The cover 12 is provided with a centrally upwardly extending reduced tubular portion 19 having an exterior shoulder or seat 20 to receive the lower end of the tubular neck or sleeve 3. The shoulder or seat 20 is located below the top of the reduced portion 19, which fits within the lower end of the tubular neck or sleeve. The other end of the tubular neck or sleeve receives the lower reduced portion 21 of the head 4 and abuts at its upper edge against the shoulder 22 formed by the reduced portion 21. The head 4 is connected with the central portion of the cap or cover by vertical stay rods 23 having threaded ends for the reception of upper and lower nuts 24 and 25 which, with the stay rods, securely maintain the sleeve or neck, the head and the cap or cover in assembled relation. A pair of nuts 25 is mounted at the lower end of each stay rod for firmly clamping the rods to the cap or cover.

The pointer 7, which is preferably of nonmetallic material, is elongated to amplify the indicating means and it extends from the head 4 to a point within the lower body portion of the casing and it is adjustably connected with a pendulum structure 26 by a clamp 27 consisting substantially of a sleeve split longitudinally and of rectangular formation in cross section to receive the lower portion of the pointer 7 which may be frictionally or otherwise confined within the clamp. The clamp has a depending shank 28 which is adjustably secured by a bolt 29 to an arm 30 rigid with and adjustably secured to a bracket 31 of the pendulum structure 26 by a bolt 32.

The bolt 29 is arranged horizontally and the bolt 32 is disposed vertically and they provide for a vertical and horizontal adjustment and for an easy and accurate calibration of the pointer, which, although elongated to amplify the indicating means, may be accurately adjusted with relation to the center or dial zero mark 33. By amplifying the indicating means by elongating the pointer, joints and intermediate levers ordinarily employed for amplifying or increasing the range of movement of indicating means are eliminated and the structure of the indicating means greatly simplified and reduced in cost with enhanced strength and stability.

The pendulum structure is mounted for oscillation on a horizontal axis formed by a pivot rod 34 and it is actuated in its oscillatory movement with relation to the zero mark of the dial of the indicating means, by means of a stiff paid out portion of a line 35 of a tensioned reel 36. The inner end of the line is securely attached by any suitable means to the reel and the paid out portion of the line extends from the front of the steering pilot and is provided at its free end with means for connecting it to the front bumper of an automobile or other motor vehicle at approximately the middle thereof so that, as the motor vehicle is steered toward the steering pilot, any deviation from a straight line course either to the right or to the left, will swing the extended or paid out portion of the line which, through its hereinafter described connection with the pendulum structure, causes a corresponding movement of the same which is transmitted to the pointer and the latter indicates on the dial both the direction and amount of such deviation from a straight line course to the steering pilot and the driver of the automobile will thereby be able to correct the steering of the vehicle and steer the same in a substantially straight line toward the steering pilot to the desired position on the shop or service floor.

One end of the tensioned reel is provided with a stub shaft or trunnion 37 which is journaled in a suitable bearing of a bracket or support 38 and the other end of the tensioned reel is connected by a friction drive or clutch 39 with an electric motor 40 or other suitable power supplying means for applying a predetermined torque to the tensioned reel for positively maintaining the extended or paid out portion of the line in a stiff, rigid condition when the line is connected with a motor vehicle and the electric motor or other power is in operation.

The friction drive, shown in the accompanying drawings, is composed of two members 41, 42, having flat engaging surfaces and adapted to permit slippage of the reel when the tension of the line exceeds the torque applied to the reel by the electric motor. The tension of the reel line drops slightly when driving to location and increases slightly when moving away from the steering pilot. The torque output is sufficient to overcome any possibility of fault from such source. In other words, any change of tension on the reel line, when attached to a vehicle being guided to location toward the steering pilot, is so small that no harm results from such change in tension.

The bearing or support 38 and the motor are mounted on a non-metallic supporting member 43 which may be constructed of wood or any other suitable material and it is secured to the base by bolts 44 or other suitable fastening devices on which are arranged upper and lower cushions 45 and 46, the lower cushions 46 spacing the supporting member 43 from the base 10. The non-metallic supporting member 43 and the upper and lower cushions 45 and 46 practically eliminate sound in the operation of the reel and the motor.

The line 35 extends upwardly from the reel to an overhead sheave 47 mounted on a horizontal stub shaft 48 disposed at right angles to the axis of the reel and the overhead sheave is arranged so that the line extends tangentially from the sheave to the reel to permit under tension pay out or reel in of the line in accordance with demand on the line.

The line extends from the sheave 47 forwardly under a front sheave 49 and through a front opening 50, which is surrounded by a bezel 51 of rubber or other suitable material of annular formation and slightly tapered and having horizontal and beveled edges 52 and 53 at its central opening to avoid abrasion of the line. The bezel 51 is secured by screws or any other suitable fastening means to the casing and it, of course, may be made of any other suitable material which will avoid abrasion of the line of the slip reel. The sheaves 47 and 49 have convex peripheral faces generated into a central groove which always presents the line 35 to the exact center of each sheave which is vertical to its horizontal axis.

The stub shaft 48 is carried by a bracket 54 fixed to and extending upwardly from an arm 55 of a hanger 56 and provided with a horizontal top portion 57 which overhangs the sheave 47 and forms a finger or guard for retaining the line in the groove of the sheave 47. The hanger 56 is composed of spaced vertical parallel sides and a connecting bottom portion 58 to which is secured an approximately inverted U-shaped hanger member 59 extending across the bottom portion 58 of the hanger and having depending sides 60 which provide bearing supports for the pivot rod 34 of the pendulum structure 26. The upper ends of the sides of the hanger 56 are rigidly secured to the central reduced portion of the cap or cover 12 interiorly thereof and they are spaced apart and limit the oscillations or swinging movement of the pendulum structure.

The pendulum structure consists of an approximately inverted U-shaped body portion 61 and a horizontal arm 62 fixed to the top of the body portion 61 and supporting at its outer end, the bracket 31 upon which the adjustable arm 30 is mounted. The ends 63 of the pivot rod 34 are threaded for the reception of adjusting nuts 64 and spacers, in the form of collars, are arranged on the pivot rod and said spacers are interposed between the sides of the hanger 59 and the sides 65 and 66 of the U-shaped body portion of the pendulum structure. The side 66 of the pendulum structure is extended below the pivot rod 34 to provide an arm for carrying a plurality of weights 67 for counterbalancing the pendulum structure and for enabling a pointer arm of maximum length to be employed for amplifying the indicating means the desired extent.

The counter-balancing weights are detachably mounted on a horizontal bolt 68 secured to and extending from the lower terminal portion of the arm 66 and the counter-balancing weights 67 may be of any desired number and size for effecting a counter balancing of the pendulum structure and a stabilizing action on the pointer to prevent pointer flutter.

That portion of the line passing beneath and in engagement with the sheave 49 is retained in engagement with the same by means of a spring finger 69 secured at one end to the arm 62 at a point intermediate to the ends thereof and extending outwardly with respect to the body portion of the pendulum structure and located below and slightly spaced from the sheave 49 to permit free rotation thereof and, at the same time, the nearness or closeness of the terminal portion of the spring finger will prevent any accidental displacement of the line from the sheave 49.

The free end of the line is secured to one end of a stop knob 70 which also has attached to it the shank 71 of a hook 72 which is adapted to engage the front bumper 73 of an automobile or other motor vehicle indicated in dotted lines in Fig. 1 of the drawings. The terminal bumper-engaging portion or bill 74 of the hook is provided with a cover 75 of rubber or other suitable material adapted to prevent the hook from slipping on the surface of the bumper. The shank of the hook is preferably provided with a resilient cushioning coil spring 76 and it constitutes an adapter for enabling the line to be readily connected to a motor vehicle. The stop knob is provided with a central bore 77 in which the shank of the hook and the free end of the line are secured by clamping screws 78 and 79. The tapered stop knob is of greater diameter at its central portion than the central opening of the bezel 51 and it will limit the inward movement of the line should the same become disconnected from the motor vehicle while the power supplying means of the slip reel is in operation.

The base of the casing is provided with an opening 80 for the passage of a cable 81 containing feed wires and extending from a suitable control switch to a current feed box 82 on the side of the motor for feeding current to the motor and also, by means of an electric cord 83, to the electric light bulb 8 mounted in a conventional socket supported by a bracket 85 secured to the neck or sleeve interiorly thereof and located adjacent the head of the casing so that the electric light bulb will extend into the hollow head and brilliantly illuminate the same and enable the operator of the motor vehicle, to which the line of the slip reel is attached, to see clearly the indicating means and steer in a substantially straight line toward the steering pilot to the desired position on the shop floor upon which the steering pilot is mounted.

As illustrated in Fig. 1 of the drawings, the steering pilot is designed to be mounted on a shop floor on which is delineated a central line 86 which preferably extends between testing drums 87 constructed and arranged in accordance with the wheel-aligning apparatus of the aforesaid patent. The central line is preferably extended rearwardly beyond the steering pilot and the shop floor in advance of the testing drums is marked off by parallel lines to define lanes 88 for the passage of the wheels of a motor vehicle connected to the line of the slip reel and steered toward the steering pilot.

As illustrated in Fig. 7 of the drawings, if the rear axle of a motor vehicle connected to the slip reel line has shifted backwardly to the right in said Fig. 7, it would throw the rear wheels out of line with the front wheels and the rear wheels will not track or follow the front wheels and this condition will also cause the front wheel at the right side of Fig. 7 to be forward of the front wheel of the opposite side of the motor vehicle and it will be clear that the parallel lines forming the lanes for the wheels will enable such faults to be readily observed, noted and more readily corrected.

Any deviation of the line of the slip reel by a swinging movement either to the right or left from a central front line position in parallelism with the center line of the shop floor will result in a lateral swinging movement of the front sheave 49 of the pendulum structure and a corresponding movement of the pointer which will be carried from a central zero position either to the right or to the left to numerically designated calibrated scale markings on the dial 6.

When a motor vehicle is progressing toward the steering pilot, every road condition may be observed and noted for correction. The invention provides means for transmitting direction steering actions of a vehicle guided by its operator or steersman to indicating mechanism and will indicate the defects of the motor vehicle in steering the same in a substantially straight course to the required or proper position in front of the steering pilot.

If the center line and side lines defining the lane for the motor vehicle wheels are invisible to the operator or driver, any deviation through fault of the machine will be indicated by the indicating means and the operator of the motor vehicle will be able to change the direction of the motor vehicle and steer in a substantially straight line to the designated spot.

It will be apparent that the steering pilot is of great advantage for use in connection with the wheel aligning and frame straightening apparatus of the aforesaid patent as well as for properly positioning the machine with relation to a hoisting mechanism or lift or an area requiring position precision location of said vehicle for repair as well as to avoid floor openings or contact with possible damaging obstructions.

It will also be clear that the rigidity of the paid out portion of the line of the slip reel will be maintained while a vehicle is moving forwardly or rearwardly as it may be necessary to back up in reverse for another try to properly locate the vehicle.

The steering pilot affords the driver of the motor vehicle attached to the line of the reel, an accurate knowledge of the behavior of the vehicle under all possible road conditions of driving, while steering the vehicle toward or from the steering pilot and, at the same time, enables the driver to steer the vehicle in a substantially straight line, for, as soon as the pointer of the indicating means goes either toward the right or left from a central zero position, the driver will correct the steering and bring the vehicle back to a central straight course toward the steering pilot.

I claim:

1. A stationary steering pilot for use on a service correction floor and including an extensible laterally swingable member and having a fixed central axis for the laterally swingable member, said member extending forwardly from said axis and actuated by lateral movements of a steered motor vehicle connected with said member in moving toward and from said central axis, indicating means located adjacent said central axis and comprising an upright pointer pivotally mounted for oscillatory movement on a horizontal axis located in the vertical plane of the laterally swingable member when the latter is in a central position, said pointer being of a size to be observed by the operator of the vehicle when the swingable member is in its extended position, and means actuated by the lateral swinging of said member for operating the indicating means to indicate angularity of the extensible member in steering the vehicle in a straight line course toward said axis to enable the operator to steer a vehicle in a substantially straight line to a desired position on said correction floor.

2. A stationary steering pilot for use on a service correction floor and including an extensible tensioned laterally swingable line and having a fixed central axis for the laterally swingable line, said line extending forwardly therefrom and actuated by lateral movements of a steered motor vehicle connected with said line in moving toward and from said central axis, indicating means located adjacent said central axis and comprising an upright pointer mounted for oscillatory movement on a horizontal axis located in the vertical plane of the laterally swingable line when the latter is in a central position, said pointer being located above the line and of a size to be observed by the operator of the vehicle when the line is in its extended position, means actuated by the lateral swinging of said line for operating the indicating means to indicate angularity of the line in steering the vehicle in a straight line course toward said axis to enable the operator to steer a vehicle in a substantially straight line to a desired position and means for tensioning said line operable to shorten the line and increase the sensitiveness of the indicating means when the vehicle moves forward.

3. A stationary steering pilot for use on a service correction floor and including an extensible laterally swingable member and having a fixed central axis for the laterally swingable member, said member extending forwardly from said axis and actuated by lateral movements of a steered motor vehicle connected with said member in moving toward and from said central axis, an upright indicating pointer located adjacent said central axis in position to be observed by the operator of the vehicle, a pendulum structure supporting said pointer and mounted for oscillatory movement on a horizontal axis located in the vertical plane of the swingable member when the latter is in a central position and actuated by the lateral swinging of said member for operating the indicating pointer to indicate angularity of the extensible member in steering the vehicle in a straight line course toward said axis to enable the operator to steer a vehicle in a substantially straight line to a desired position and means for tensioning said member operable to shorten the member and increase the sensitiveness of the indicating means when the vehicle moves forward.

4. A stationary steering pilot for use on a service correction floor and including an extensible tensioned laterally swingable line and having a fixed central axis for the laterally swingable line, said line extending forwardly therefrom and actuated by lateral movements of a steered motor vehicle connected with said line in moving toward and from said central axis, an upright indicating member located adjacent said central axis in position to be observed by the operator of the vehicle, and a pendulum structure supporting said indicating member and mounted for oscillatory movement on a horizontal axis located in the vertical plane of the swingable member when the latter is in a central position and actuated by the lateral swinging of said line for operating the indicating means to indicate angularity of the line in steering the vehicle in a straight line course toward said axis to enable the operator to steer a vehicle in a substantially straight line to a desired position and means for tensioning the laterally swingable line operable to increase the sensitiveness of the indicator as the vehicle moves forward.

5. A stationary steering pilot for enabling a motor vehicle to be steered in a substantially straight course on a service correction floor toward and from the steering pilot, said steering pilot including a slip reel having a line extending forwardly from the steering pilot, said steering pilot having a central fixed axis for the extended portion of the line to permit lateral swinging movement of said extended portion of the line, means for connecting the free end of the line to a motor vehicle, means for applying torque to the slip reel to maintain the extended portion of the line in a stiff rigid condition under a predetermined tension for swinging movement when the vehicle traveling toward or from the steering pilot deviates from the central straight course, an upright indicating member in position to be observed by the operator of the vehicle, and means supporting said indicating member and mounted for oscillation on a horizontal axis located in the plane of said line when the latter is in a central position and actuated by the swinging of the extended portion of the line of the slip reel for operating the indicating member for indicating the direction and the degree of angularity of the extended portion of the line of the slip reel, said torque applying means operating to shorten the extended portion of the line and increase the sensitiveness of the indicating means as the vehicle moves forward.

6. A stationary steering pilot for enabling a motor vehicle to be steered in a substantially straight course on a service correction floor toward and from the steering pilot, said steering pilot including a slip reel having a line extending forwardly from the steering pilot, said steering pilot having a central fixed axis for lateral swinging movement of the extended portion of the line, means for connecting the free end of the line to a motor vehicle, means for applying torque to the slip reel to maintain the extended portion of the line in a stiff rigid condition for swinging movement when the vehicle traveling toward or from the steering pilot deviates from the central straight course, an upright indicating member in position to be observed by the operator of the vehicle, and a pendulum structure supporting said indicating member and mounted for oscillatory movement on a horizontal axis located in the vertical plane of the line when the latter is in a central position and actuated by the lateral angular movements of the line of the slip reel for moving the indicating member for indicating the direction of lateral movement and degree of angularity of the extended portion of the line of the slip reel, said torque applying means operating to shorten the extended portion of the line and increase the sensitiveness of the indicating means as the vehicle moves forward.

7. A stationary steering pilot for enabling a motor vehicle to be steered in a substantially straight course on a service correction floor toward and from the steering pilot, said steering pilot including a slip reel having a line extending forwardly from the steering pilot, said steering pilot having a central fixed axis for lateral swinging movement of the extended portion of the line, means for connecting the free end of the line to a motor vehicle, means for applying torque to the slip reel to maintain the extended portion of the line in a stiff rigid condition for swinging movement when the vehicle traveling toward or from the steering pilot deviates from the central straight course, indicating means including a fixed dial and an upright pointer movable over the fixed dial, and a pendulum structure supporting the pointer and mounted for oscillatory movement on a horizontal axis located in the vertical plane of the line when the latter is in a central position and actuated by the lateral angular movements of the line of the slip reel for operating the indicating means for indicating the direction of lateral movement and the degree of angularity of the extended portion of the line of the slip reel, said torque applying means operating to shorten the extended portion of the line and increase the sensitiveness of the indicating means when the vehicle moves forward.

8. A stationary steering pilot for enabling a motor vehicle to be steered in a substantially straight course on a service correction floor toward and from the steering pilot, said steering pilot including a slip reel having a line extending forwardly from the steering pilot, said steering pilot having a central fixed axis for lateral swinging movement of the extended portion of the line, means for connecting the free end of the line to a motor vehicle, means for applying torque to the slip reel to maintain the extended portion of the line in a stiff rigid condition for swinging movement when the vehicle traveling toward or from the steering pilot deviates from the central straight course, indicating means including a stationary dial and a relatively long pointer arranged in an upright position and located above and in the vertical plane of the line when the latter is in a central position and a pendulum structure pivotally mounted below the line and carrying the elongated pointer and actuated by the lateral movements of the line of the slip reel for operating the indicating means for indicating the direction of lateral movement and the degree of angularity of the extended portion of the line of the slip reel, said torque applying means operating to shorten the extended portion of the line and increase the sensitiveness of the indicating means when the vehicle moves forward.

9. A stationary steering pilot for enabling a motor vehicle to be steered in a substantially straight course on a service correction floor toward and from the steering pilot, said steering pilot including a slip reel having a line extending forwardly from the steering pilot, said steering pilot having a central fixed axis for lateral swinging movement of the extended portion of the line, means for connecting the free end of the line to a motor vehicle, means for applying torque to the slip reel to maintain the extended portion of the line in a stiff rigid condition for swinging movement when the vehicle traveling toward or from the steering pilot deviates from the central straight course, indicating means including a stationary dial and a relatively long pointer, and a pendulum structure carrying the elongated pointer and pivotally mounted at a point below the same and provided with counterbalancing means, said pendulum structure being actuated by the lateral movements of the line of the slip reel for operating the indicating means for indicating the direction of lateral movement and the degree of angularity of the extended portion of the line of the slip reel, said torque applying means operating to shorten the extended portion of the line and increase the sensitiveness of the indicating means when the vehicle moves forward.

10. A stationary steering pilot for enabling a motor vehicle to be steered in a substantially straight course on a service correction floor toward and from the steering pilot, said steering pilot including a slip reel having a line extending forwardly from the steering pilot, said steering pilot having a central fixed axis for lateral swinging movement of the extended portion of the line, means for connecting the free end of the line to a motor vehicle, means for applying torque to the slip reel to maintain the extended portion of the line in a stiff rigid condition for swinging movement when the vehicle traveling toward or from the steering pilot deviates from the central straight course, indicating means including a stationary dial and a relatively long pointer, and a pendulum structure carrying the elongated pointer and pivotally mounted at a point below the same and provided with a plurality of counterbalancing weights, said pendulum structure being actuated by the lateral movements of the line of the slip reel for operating the indicating means for indicating the direction of lateral movement and the degree of angularity of the extended portion of the line of the slip reel, said torque applying means operating to shorten the extended portion of the line and increase the sensitiveness of the indicating means when the vehicle moves forward.

11. A stationary steering pilot for enabling a motor vehicle to be steered in a substantially straight course on a service correction floor toward and from the steering pilot, said steering pilot including a slip reel having a line extending forwardly from the steering pilot, said steering pilot having a central fixed axis for lateral swinging movement of the extended portion of the line, means for connecting the free end of the line to a motor vehicle, means for applying torque to the slip reel to maintain the extended portion of the line in a stiff rigid condition for swinging movement when the vehicle traveling toward or from the steering pilot deviates from the central straight course, indicating means including a fixed dial and a relatively long upright pointer, a pendulum structure pivotally mounted for oscillation on a horizontal axis located below the line and in the vertical plane of the same when the line is in a central position and actuated by lateral angular movements of the extended portion of the line of the slip reel, and clamping means carried by the pendulum structure and adjustably receiving the pointer and adjustably connected with the pendulum structure for calibration adjustment, said torque applying means operating to shorten the extended portion of the line and increase the sensitiveness of the indicating means when the vehicle moves forward.

12. A stationary steering pilot for enabling a motor vehicle to be steered in a substantially straight course on a service correction floor toward and from the steering pilot, said steering pilot including a slip reel having a line extending forwardly from the steering pilot, said steering pilot having a central fixed axis for lateral swinging movement of the extended portion of the line, means for connecting the free end of the line to a motor vehicle, means for applying torque to the slip reel to maintain the extended portion of the line in a stiff rigid condition for swinging movement when the vehicle traveling toward or from the steering pilot deviates from the central straight course, indicating means including a fixed dial and a relatively long upright pointer located above and in the vertical plane of the line when the latter is in a central position, a pendulum structure pivotally mounted for oscillation on a horizontal axis located below the line and in the vertical plane of the same when the line is in a central position actuated by lateral angular movements of the extended portion of the line of the slip reel, and a member carried by the pendulum structure and rigidly connected at its ends to the pendulum structure and with the pointer and provided with means for calibration of the pointer on a horizontal axis, said torque applying means operating to shorten the extended portion of the line and increase the sensitiveness of the indicating means when the vehicle moves forward.

13. A stationary steering pilot for enabling a motor vehicle to be steered in a substantially straight course on a service correction floor toward and from the steering pilot, said steering pliot including a slip reel having a line extending forwardly from the steering pilot, said steering pilot having a central fixed axis for lateral swinging movement of the extended portion of the line, means for connecting the free end of the line to a motor vehicle, means for applying torque to the slip reel to maintain the extended portion of the line in a stiff rigid condition for swinging movement when the vehicle traveling toward or from the steering pilot deviates from the central straight course, indicating means including a fixed dial and a relatively long upright pointer located above and in the vertical plane of the line when the latter is in a central position, a pendulum structure pivotally mounted for oscillation on a horizontal axis located below the line and in the vertical plane of the same when the line is in a central position actuated by lateral angular movements of the extended portion of the line of the slip reel, and a member carried by the pendulum structure and rigidly connected with the pointer and adjustably secured to the pendulum structure for movement on a vertical axis for calibration adjustment of the pointer, said torque applying means operating to shorten the extended portion of the line and increase the sensitiveness of the indicating means when the vehicle moves forward.

14. A stationary steering pilot for use on a service correction floor and including a casing comprising a lower body portion, an upwardly extending tubular neck and a hollow head, a slip reel in said casing having a line extending forwardly from the casing, torque applying means connected with the slip reel for tensioning the line, guiding means for the line mounted within the casing and located above the reel and forming a fixed axis for lateral angular movement of said line, means for connecting the free end of the line with a manually steered motor vehicle, indicating means located within the hollow head of the casing and visible to the operator of said vehicle, a pivotally mounted pendulum structure connected with and actuating the indicating means and provided with guiding means spaced from the said guiding means and receiving the line and actuated by the lateral angular movement of the extended portion of the line for operating the indicating means, said torque applying means operating to decrease the length of the extended portion of the line and increase the sensitiveness of the indicating means when the vehicle moves forward.

15. A stationary steering pilot for enabling a motor vehicle to be steered in substantially a straight course on a service correction floor toward and from the steering pilot, said steering pilot including a constant power actuated slip reel having a line extending forwardly from the steering pilot, a sheave located above the slip reel and receiving the line and forming a fixed central axis for lateral angular movement of the line, means for connecting the free end of the line to a manually steered motor vehicle, indicating means in position to be observed by the operator of the vehicle, a pendulum structure pivotally mounted below the line for oscillatory movement on a horizontal axis located in the vertical plane of the line when the latter is in a central position and connected with and actuating the indicating means, and guiding means carried by the pendulum structure and spaced a short distance from the said sheave and receiving and, actuated by lateral angular movement of the extended portion of the line for operating the indicating means, said slip reel operating to decrease the length of the extended portion of the line and increase the sensitiveness of the indicating means when the vehicle moves forward.

16. A stationary steering pilot for enabling a motor vehicle to be steered in substantially a straight course on a service correction toward and from the steering pilot, said steering pilot including a constant power actuated slip reel having a line extending forwardly from the steering pilot, guiding means located above the slip reel and receiving the line and forming a fixed central axis for lateral angular movement of the line, means for connecting the free end of the line to a manually steered motor vehicle, indicating means in position to be observed by the operator of the vehicle, a pendulum structure pivotally mounted below the line for oscillatory movement on a horizontal axis located in the vertical plane of the line when the latter is in a central position and connected with and actuating the indicating means, and a sheave carried by the pendulum structure and spaced from the said guiding means and receiving and actuated by lateral angular movement of the extended portion of the line for operating the indicating means, said slip reel operating to decrease the length of the extended portion of the line and increase the sensitiveness of the indicating means when the vehicle moves forward.

17. A stationary steering pilot for enabling a motor vehicle to be steered in substantially a straight course on a service correction floor toward and from the steering pilot, said steering pilot including a constant power actuated slip reel having a line extending forwardly from the steering pilot, a sheave located above the slip reel and receiving the line and forming a fixed central axis for lateral angular movement of the line, means for connecting the free end of the line to a manually steered motor vehicle, indicating means in position to be observed by the operator of the vehicle, a pendulum structure pivotally mounted below the line for oscillatory movement on a horizontal axis located in the vertical plane of the line when the latter is in a central position and connected with and actuating the indicating means, and a sheave carried by the pendulum structure and spaced from the said first mentioned sheave and receiving and actuated by lateral angular movement of the extended portion of the line for operating the indicating means, said slip reel operating to decrease the length of the extended portion of the line and increase the sensitiveness of the indicating means when the vehicle moves forward.

18. A steering pilot including a casing comprising a lower body portion, an upwardly extending tubular neck and a hollow head, a slip reel in the casing having a line extending forwardly from the casing, torque applying means connected with the slip reel for tensioning the line, guiding means for the line mounted within the casing and located above the slip reel and forming a fixed axis for lateral angular movement of said line, a hook having a shank connected with the free end of the line and provided at an intermediate point with a spring coil and having a bill at its outer end for engaging a portion of a manually steered motor vehicle, indicating means located within the hollowing head of the casing and visible to the operator of said vehicle, a pivotally mounted pendulum structure in the casing connected with and actuating the indicating means and provided with guiding means spaced from the said guiding means and receiving the line and actuated by the lateral angular movement of the extended portion of the line for operating the indicating means.

19. A stationary steering pilot for use on a service correction floor, a slip reel having a line extending forwardly from the steering pilot for connection with a manually steered vehicle, guiding means for the line forming a fixed axis for lateral swinging movement of the extending portion of the line, a friction clutch connected with the slip reel, a motor connected with the friction clutch for applying torque to the reel for tensioning the extended portion of the line, indicating means located at the front of the steering pilot in position to be observed by the operator of the vehicle, and means actuated by the lateral angular movement of the line for operating the indicating means to indicate any deviation of the vehicle from a straight line course toward the steering pilot whereby the operator is enabled to steer the vehicle in a substantially straight course toward the steering pilot for properly positioning the vehicle with relation to corrective apparatus.

GEORGE H. TABER.

REFERENCES CITED

The following references are of record in the file of this patent:

UNITED STATES PATENTS

| Number | Name | Date |
|---|---|---|
| 567,597 | Kerstetter | Sept. 15, 1896 |
| 1,975,419 | Grube | Oct. 2, 1934 |
| 2,114,481 | Taber | Apr. 19, 1938 |
| 2,214,161 | Cater | Sept. 10, 1940 |
| 2,386,884 | Carlson | Oct. 16, 1945 |
| 2,396,453 | Windle | Mar. 12, 1946 |
| 2,436,418 | Bradford | Feb. 24, 1948 |
| 2,451,244 | Scott et al. | Oct. 12, 1948 |